United States Patent
Suzuki

(10) Patent No.: US 9,606,344 B2
(45) Date of Patent: Mar. 28, 2017

(54) MICROSCOPE SYSTEM

(71) Applicant: OLYMPUS CORPORATION, Shibuya-ku, Tokyo (JP)

(72) Inventor: Shingo Suzuki, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 59 days.

(21) Appl. No.: 13/888,034

(22) Filed: May 6, 2013

(65) Prior Publication Data
US 2013/0301120 A1 Nov. 14, 2013

(30) Foreign Application Priority Data
May 11, 2012 (JP) .................. 2012-109541

(51) Int. Cl.
    *G02B 21/00* (2006.01)
    *G02B 21/02* (2006.01)
(52) U.S. Cl.
    CPC .......... *G02B 21/02* (2013.01); *G02B 21/008* (2013.01); *G02B 21/0076* (2013.01)
(58) Field of Classification Search
    CPC .. G02B 21/002; G02B 21/0032; G02B 21/06; G02B 21/0064; G02B 21/0076;
(Continued)

(56) References Cited

U.S. PATENT DOCUMENTS 5,886,784 A * 3/1999 Engelhardt ............... G01J 3/02
    356/326
7,943,909 B2 5/2011 Mano
(Continued)

FOREIGN PATENT DOCUMENTS

EP     1 669 789 A     6/2006
EP     2093560 A1     8/2009
(Continued)

OTHER PUBLICATIONS

Extended European Search Report (EESR) dated Aug. 21, 2013 (in English) in counterpart European Application No. 13166885.7.
(Continued)

*Primary Examiner* — Bumsuk Won
*Assistant Examiner* — Balram Parbadia
(74) *Attorney, Agent, or Firm* — Holtz, Holtz & Volek PC

(57) ABSTRACT

Provided is a microscope system that including: a plurality of image-capturing sections that are provided in a microscope to capture a plurality of lights from a specimen; a capture-condition setting section that allows a user to set an image-capturing order of the plurality of groups into which the lights are classified, and the image-capturing sections for image-capturing of the lights; and a control section that causes the microscope to perform image capturing of the lights according to contents set in the capture-condition setting section. The capture-condition setting section has a table in which an first axis indicates the groups and a second axis indicates the image-capturing sections, and a plurality of cells that are each associated with one of the groups and one of the image-capturing sections are arrayed in a matrix; and captured items that indicate image-capturing of the lights are set in the cells.

13 Claims, 5 Drawing Sheets

(58) Field of Classification Search
CPC .................. G02B 21/365; G02B 21/00; G01N 2021/6419; G01N 2021/6421; G01N 21/6458
USPC ........ 345/473; 715/765; 250/458.1; 359/368
See application file for complete search history.

(56) References Cited

U.S. PATENT DOCUMENTS

| | | | |
|---|---|---|---|
| 2004/0174593 A1 | 9/2004 | Weyh et al. | |
| 2005/0073742 A1 | 4/2005 | Weyh et al. | |
| 2005/0270639 A1* | 12/2005 | Miki | G02B 21/0088 359/381 |
| 2005/0282268 A1* | 12/2005 | Kagayama | C12M 23/50 435/288.7 |
| 2006/0038996 A1* | 2/2006 | Kuroiwa | G01J 3/02 356/328 |
| 2006/0129353 A1 | 6/2006 | Hattori et al. | |
| 2007/0115544 A1 | 5/2007 | Weyh et al. | |
| 2009/0183062 A1* | 7/2009 | Pally | G06F 17/30905 715/217 |
| 2009/0250628 A1* | 10/2009 | Mano | 250/458.1 |
| 2010/0278425 A1* | 11/2010 | Takemoto | G06T 7/0079 382/173 |
| 2011/0185298 A1* | 7/2011 | Skatter et al. | 715/765 |
| 2011/0261060 A1* | 10/2011 | Waibel et al. | 345/473 |
| 2012/0102432 A1* | 4/2012 | Breedvelt-Schouten | G06F 17/30398 715/823 |
| 2012/0117500 A1* | 5/2012 | Maim | G06F 17/246 715/769 |

FOREIGN PATENT DOCUMENTS

| | | | | |
|---|---|---|---|---|
| JP | 08-43739 A | | 2/1996 | |
| JP | 10069480 A | | 3/1998 | |
| JP | 2001-356272 A | | 12/2001 | |
| JP | 2003-295064 A | | 10/2003 | |
| JP | 2003295064 A | * | 10/2003 | ............ G02B 21/00 |
| JP | 2005-352030 A | | 12/2005 | |
| JP | 2009204408 A | | 9/2009 | |
| JP | 2011017658 A | | 1/2011 | |
| WO | 2008072365 A1 | | 6/2008 | |

OTHER PUBLICATIONS

Japanese Office Action (and English translation thereof) dated Apr. 5, 2016, issued in counterpart Japanese Application No. 2012-109541.

* cited by examiner

|  | FIRST DETECTOR | SECOND DETECTOR |
|---|---|---|
| FIRST GROUP | FITC | PI |
| SECOND GROUP |  | Cy5 |

(b)

|  | FIRST DETECTOR | SECOND DETECTOR |
|---|---|---|
| FIRST GROUP | FITC |  |
| SECOND GROUP |  | PI |
| THIRD GROUP |  | Cy5 |

(c)

|  | FIRST DETECTOR | SECOND DETECTOR |
|---|---|---|
| FIRST GROUP | FITC | Cy5 |
| SECOND GROUP |  | PI |

(d)

|  | FIRST DETECTOR | SECOND DETECTOR |
|---|---|---|
| FIRST GROUP | FITC | Cy5 |
| SECOND GROUP | PI |  |

FIG. 4

MICROSCOPE SYSTEM

CROSS-REFERENCE TO RELATED APPLICATIONS

This application is based on Japanese Patent Application No. 2012-109541, the content of which is incorporated herein by reference.

TECHNICAL FIELD

The present invention relates to a microscope system.

BACKGROUND ART

There are known conventional microscopes in which a plurality of observed lights produced from a specimen are classified into a plurality of groups, and the observed lights in the individual groups are sequentially captured with a time difference therebetween (for example, see PTL 1 and PTL 2). According to such microscopes, it is possible to capture a larger number of observed lights than the number of photodetectors. Furthermore, when the wavelength bands of a plurality of observed lights overlap each other, the plurality of observed lights are classified into separate groups, thereby making it possible to capture the observed lights without crosstalk.

CITATION LIST

Patent Literature

{PTL 1} Japanese Unexamined Patent Application, Publication No. 2003-295064
{PTL 2} Japanese Unexamined Patent Application, Publication No. 2001-356272

SUMMARY OF INVENTION

Technical Problem

When the plurality of observed lights are grouped, various conditions should be taken into consideration. For example, it is necessary to determine a combination of an observed light and a photodetector such that the wavelength of the observed light matches the specifications of the photodetector, for example, the sensitivity and the optimum wavelength band thereof. Furthermore, when a plurality of observed lights are classified into the same group, it is necessary to combine observed lights having wavelengths that match separate photodetectors and that do not cause crosstalk.

The present invention aims to provide a microscope system that classifies a plurality of observed lights into a plurality of groups, thus facilitating grouping when image capturing is sequentially performed in groups.

Solution to Problem

The present invention provides a microscope system that classifies a plurality of observed lights produced from a specimen into a plurality of groups and that sequentially performs image capturing of the plurality of groups by means of a microscope, the microscope system including: a plurality of image-capturing sections that are provided in the microscope to capture the observed lights; a capture-condition setting section that allows a user to set an image-capturing order for the plurality of groups and the image-capturing sections to be used for image-capturing of the observed lights; and a control section that causes the microscope to perform image capturing of the observed lights according to contents set in the capture-condition setting section, in which the capture-condition setting section has a table in which one axis of a vertical axis and a horizontal axis indicates the groups, the other axis indicates the image-capturing sections, and a plurality of cells that are each associated with one of the groups and one of the image-capturing sections are arrayed in a matrix; and captured items that indicate image-capturing of the observed lights are set in the cells.

BRIEF DESCRIPTION OF DRAWINGS

FIG. 2 (a) to (d) of FIG. 2 are diagrams for explaining a table of a GUT of the microscope system shown in FIG. 1 and operations applied to the table.

FIG. 4 (a) to (e) of FIG. 4 are diagrams for explaining a table of a GUI of the microscope system shown in FIG. 3 and operations applied to the table.

DESCRIPTION OF EMBODIMENTS

First Embodiment

A microscope system 1 according to a first embodiment of the present invention will be described below with reference to FIG. 1 and FIG. 2.

Figure 1:
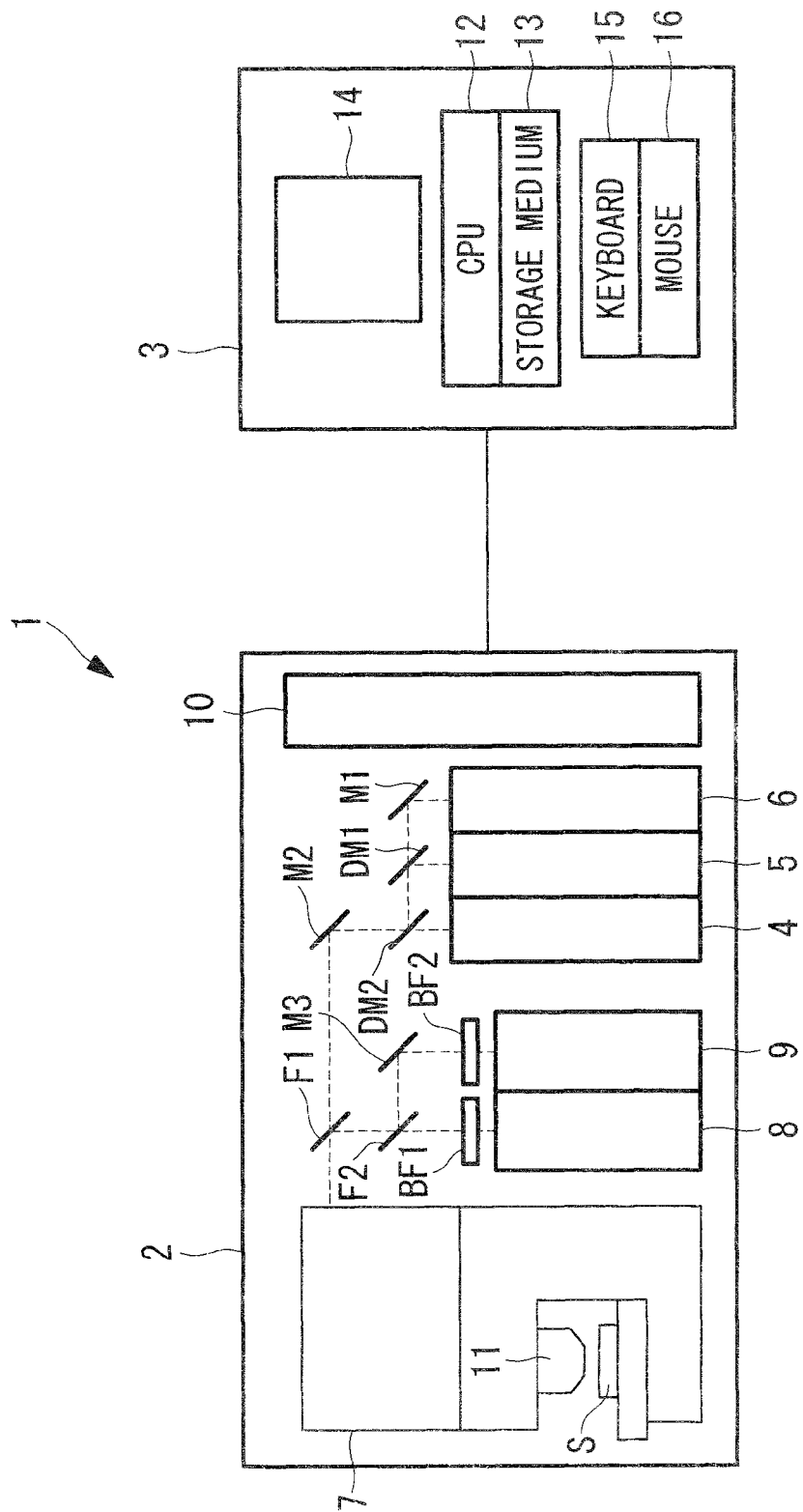
FIG. 1 is a diagram showing the overall configuration of a microscope system according to a first embodiment of the present invention.

As shown in FIG. 1, the microscope system 1 of this embodiment includes a laser scanning microscope main unit (hereinafter, referred to as main unit) 2 and a computer system 3.

The main unit 2 includes, as main components, three laser light sources 4, 5, and 6, a scanning unit 7 that scans laser light emitted from the laser light sources 4, 5, and 6 on a specimen S, two photodetectors 8 and 9 that detect observed light from the specimen S, and a control unit 10 that performs image capturing of the observed light based on a control signal received from the computer system 3.

In this embodiment, it is assumed that the specimen S is subjected to trichrome staining with FITC, PI, and Cy5, which are fluorochromes, and fluorescence (observed light) produced from these fluorochromes is captured. Specifically, an Ar laser, a HeNe-Green laser, and a HeNe-Red laser are provided as the laser light sources 4, 5, and 6 for exciting the three fluorochromes. Laser lights output from the laser light sources 4, 5, and 6 are combined by a mirror M1 and two dichroic mirrors DM1 and DM2 into a single light path, deflected by a mirror M2, and input to the scanning unit 7 via a spectral filter F1.

The scanning unit 7 has Galvanometer mirrors (not shown) and drives the Galvanometer mirrors based on a control signal sent from the control unit 10, thereby scanning the laser light focused on the specimen S through an objective lens 11. Fluorescence produced from the specimen S by the laser light that has been scanned on the specimen S returns in the opposite direction along the incident light path, is reflected by the spectral filter F1, and is input to a spectral filter F2.

The spectral filter F2 divides the fluorescence according to wavelength; relatively short-wavelength fluorescence is input to a barrier filter BF1, and relatively long-wavelength fluorescence is input to a barrier filter BF2 via a mirror M3. The respective types of fluorescence are further selected according to wavelength by the barrier filters BF1 and BF2 and are input to the photodetectors 8 and 9. The photodetectors 8 and 9 convert the intensities of the received types of fluorescence into electrical signals and output them to the control unit 10. The control unit 10 transfers the electrical signals received from the photodetectors 8 and 9 to the computer system 3 as image information of the specimen S.

Here, for each of the spectral filter F2 and the barrier filters BF1 and BF2, a plurality of filters having characteristics different from each other are mounted on a rotating turret. When the turret is rotated in response to a control command from the control unit 10, the characteristics of the spectral filter F2 and the barrier filters BF1 and BF2 to be placed in the light path can be switched.

The computer system 3 includes a CPU 12, a storage medium 13, a monitor 14, and a keyboard 15 and a mouse 16, which serve as input device. The storage medium 13 stores an application program used to set capture conditions for image capturing performed by the main unit 2, and the CPU 12 reads the application program from the storage medium 13 and executes it.

This application program displays, on the monitor 14, a table in which groups into which the three types of fluorescence are classified are associated with the two photodetectors. Furthermore, this application program is provided with a graphical user interface (GUI, capture-condition setting section) for allowing a user to register captured items in the table by using the input device. The user can register captured items in the table by using the input device. Furthermore, the user can rewrite the table by changing the conditions of captured items that have been already registered, by using the input device. The CPU 12 reads, from the storage medium 13, the table in which the captured items are written by means of the GUI and sends a control signal for performing image capturing under the conditions set in the table, to the control unit 10 in the main unit 2. Thus, image capturing of fluorescence is performed by the main unit 2 under the conditions set in the table.

The table and operations performed with the GUI will be described in detail below.

As shown in (a) of FIG. 2, the GUI has a table for setting capture conditions for image-capturing of fluorescence performed by the main unit 2. The table has a plurality of (in this embodiment, 2×2) cells arrayed in a matrix. The horizontal axis of the table indicates "first photodetector" and "second photodetector" as items corresponding to the two photodetectors 8 and 9. Furthermore, the vertical axis of the table indicates "first group" and "second group" as items corresponding to groups into which the three types of fluorescence are classified. In each cell, one of the captured items "FITC", "PI", and "Cy5" can be registered corresponding to the type of fluorescence, by using the input device.

In (a) of FIG. 2, of the cells belonging to "first group", "FITC" is registered in the cell that corresponds to "first photodetector", and "PI" is registered in the cell that corresponds to "second photodetector". Furthermore, of the cells belonging to "second group", "Cy5" is registered in the cell that corresponds to "second photodetector". This means that, among the three types of fluorescence, the FITC fluorescence and the PI fluorescence are first captured as the first group, and the Cy5 fluorescence is next captured as the second group. Furthermore, it means that, in the first group, the FITC fluorescence is captured by the first photodetector 8, and the PI fluorescence is captured by the second photodetector 9, and, in the second group, the Cy5 fluorescence is captured by the second photodetector 9.

The GUI is configured such that a captured item that has already been registered in a cell can be changed to another cell by using the input device. For example, when the user selects "Cy5", which is a captured item, and drags and drops the selected "Cy5" on a space below the table, which is outside of the table, the GUI adds a new row as "third group" below the second group and sets "Cy5" in the cell corresponding to "second photodetector" of the cells belonging to "third group".

Subsequently, by selecting "PI" and dragging and dropping "PI" on the cell that is located immediately therebelow and that has just become vacant, the user can move the cells where "Cy5" and "PI" are registered to the rows immediately therebelow, respectively, as shown in (b) of FIG. 2. Furthermore, by selecting "Cy5" and dragging and dropping it on the uppermost row, as shown in (c) of FIG. 2, the user can exchange the cells where "Cy5" and "PI" are registered from the state shown in (a) of FIG. 2. As described above, by changing a cell where a captured item is set in the row direction, it is possible to change the group in which image-capturing of the corresponding type of fluorescence is performed.

Furthermore, the GUI is configured such that a cell where a captured item is set can also be changed in the direction of the horizontal axis in the same group. For example, as shown in (d) of FIG. 2, by selecting "PI" and dragging and dropping it on the adjacent cell, the user can change the photodetector to be used for image-capturing of the PI fluorescence from the second photodetector 9 to the first photodetector 8.

Here, the GUI prohibits a captured item from being set in a cell in which another captured item has already been registered. For example, as shown in (c) of FIG. 2, when "Cy5" is selected, the GUI prohibits "Cy5" from being set in the cells in which "PI" and "FITC" have already been registered, and, even if "Cy5" is dropped on any of the prohibited cells, the GUI does not accept this change.

Note that, in (b) to (d) of FIG. 2, the cells enclosed by a thick line are manipulatable objects that are currently selected with the input device.

Next, the operational effect of the thus-configured microscope system 1 will be described.

First, the user uses the computer system 3 to set, as the capture conditions for FITC fluorescence, Cy5 fluorescence, and PI fluorescence, the groups and the photodetectors for image-capturing of the respective types of fluorescence. Specifically, captured items are registered in cells in the table displayed on the monitor 14 by using the keyboard 15 and the mouse 16. At this time, in order to simultaneously capture two or more types of fluorescence among the three types of fluorescence, the user registers the two or more types of fluorescence in the cells corresponding to different photodetectors in the same group. Information about the table in which the captured items have been registered is sent from the CPU 12 to the control unit 10 of the main unit 2.

The main unit 2 controls the laser light sources 4, 5, and 6, the filters F2, F1, and 5F2, and the photodetectors 8 and 9, based on the conditions set in the table. For example, when captured items are registered as shown in (a) of FIG. 2, the main unit 2 first performs image capturing of the first group. Specifically, the barrier filter BF1 is set for the FITC fluorescence wavelength, the barrier filter BF2 is set for the PI fluorescence wavelength, and the laser light source (Ar laser) 4 and the laser light source (HeNe-Green laser) 5 are turned on. Then, the FITC fluorescence and the PI fluorescence are simultaneously captured by the first photodetector 8 and the second photodetector 9, respectively.

Next, the main unit 2 performs image capturing of the second group. Specifically, the barrier filter BF2 is set for the Cy5 fluorescence wavelength, and the laser light source (HeNe-Red laser) 6 is turned on. Then, the Cy5 fluorescence is captured by the second photodetector 9. The image information of the respective types of fluorescence acquired by the main unit 2 is sent to the computer system 3, and the computer system 3 generates fluorescence images from the image information.

In this case, according to this embodiment, there is an advantage in that the user can visually and easily grasp, from the table, combinations of the three types of fluorescence classified into the respective groups and the photodetectors 8 and 9 to be used for image-capturing of the respective types of fluorescence. Furthermore, to change the order of image-capturing of the three types of fluorescence or to change the photodetectors 8 and 9 to be used for image-capturing of the three types of fluorescence, the user just needs to drag and drop the captured items by using the input device, as shown in (b) to (d) of FIG. 2. In this case, there is also an advantage in that the capture conditions can be visually and easily grasped from the table displayed on the monitor 14, so that the settings can be easily and accurately changed.

Second Embodiment

Next, a microscope system 1' according to a second embodiment of the present invention will be described with reference to FIGS. 3 to 5. Note that identical reference symbols are assigned to the same components as those in the microscope system 1 of the above-described first embodiment, and a description thereof will be omitted.

The microscope system 1' of this embodiment mainly differs from the microscope system 1 of the first embodiment in the configuration of photodetectors and the table set in the storage medium 13.

Figure 3:
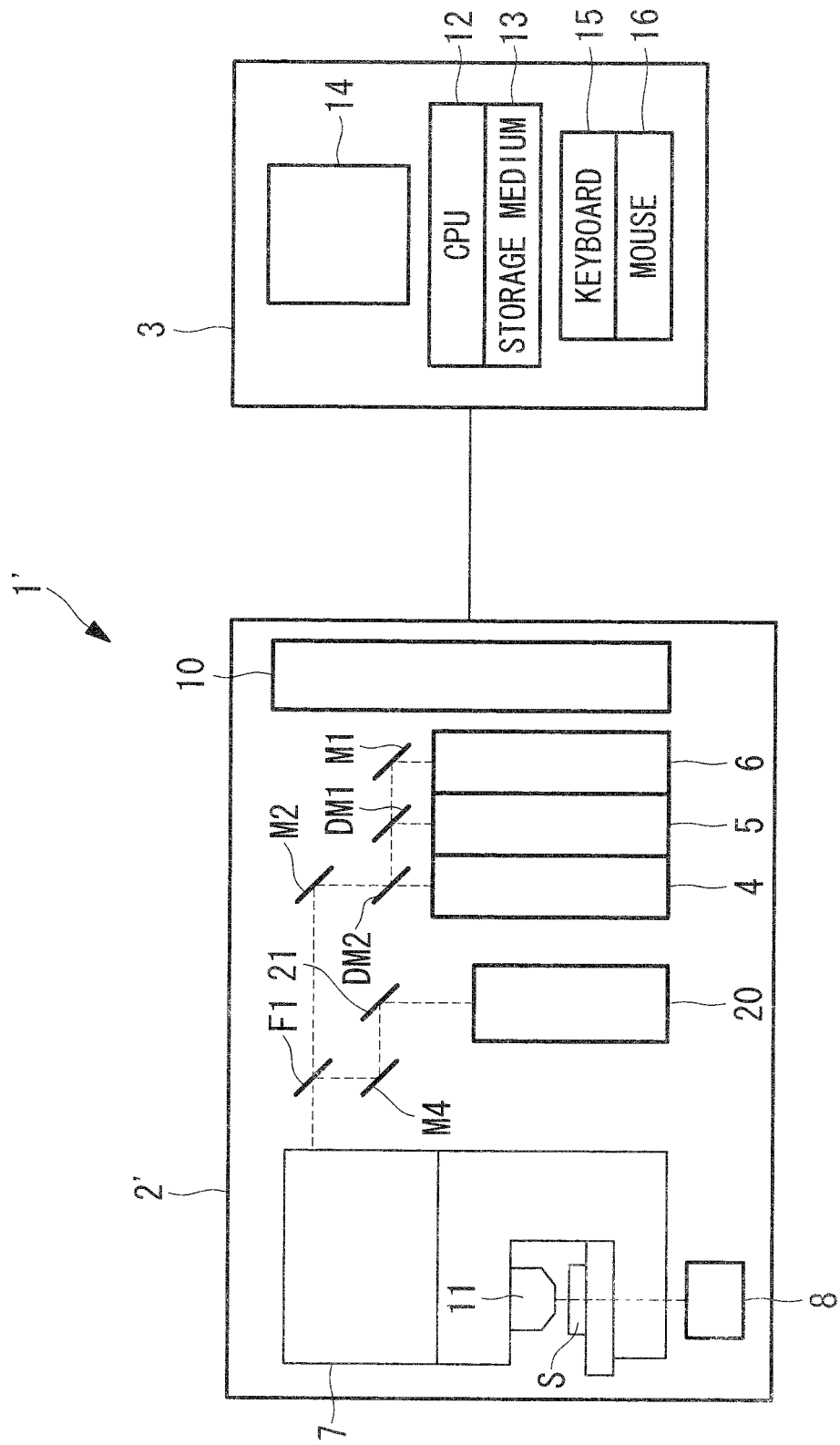
FIG. 3 is a diagram showing the overall configuration of a microscope system according to a second embodiment of the present invention.

As shown in FIG. 3, a main unit 2' is configured such that light transmitted through the specimen S is detected by the first photodetector 8, thus acquiring DIC (differential interference contrast) image information, and fluorescence collected by the objective lens 11 is detected by a second photodetector 20, thus acquiring image information about the three types of fluorescence.

Specifically, the first photodetector 8 is disposed on the side opposite to the objective lens 11 with the specimen S interposed therebetween. Furthermore, a multichannel photomultiplier (hereinafter, also referred to as multichannel PMT 20) that has 32 detection channels arranged in a line and that commonly detect the three types of fluorescence is provided as the second photodetector 20. A diffraction grating 21 that disperses fluorescence reflected by a mirror M4, along the arrangement direction of the detection channels, is provided at a stage prior to the multichannel PMT 20.

Light dispersed into respective wavelengths by the diffraction grating 21 is incident on one of the 32 detection channels that is disposed at a position corresponding to the wavelength of the light. In this embodiment, the width of the wavelength of light incident on each detection channel is set to 10 nm, and the multichannel PMT 20 is configured so as to detect light with wavelengths from 430 nm to 750 nm at a resolution of 10 nm.

Figure 4:
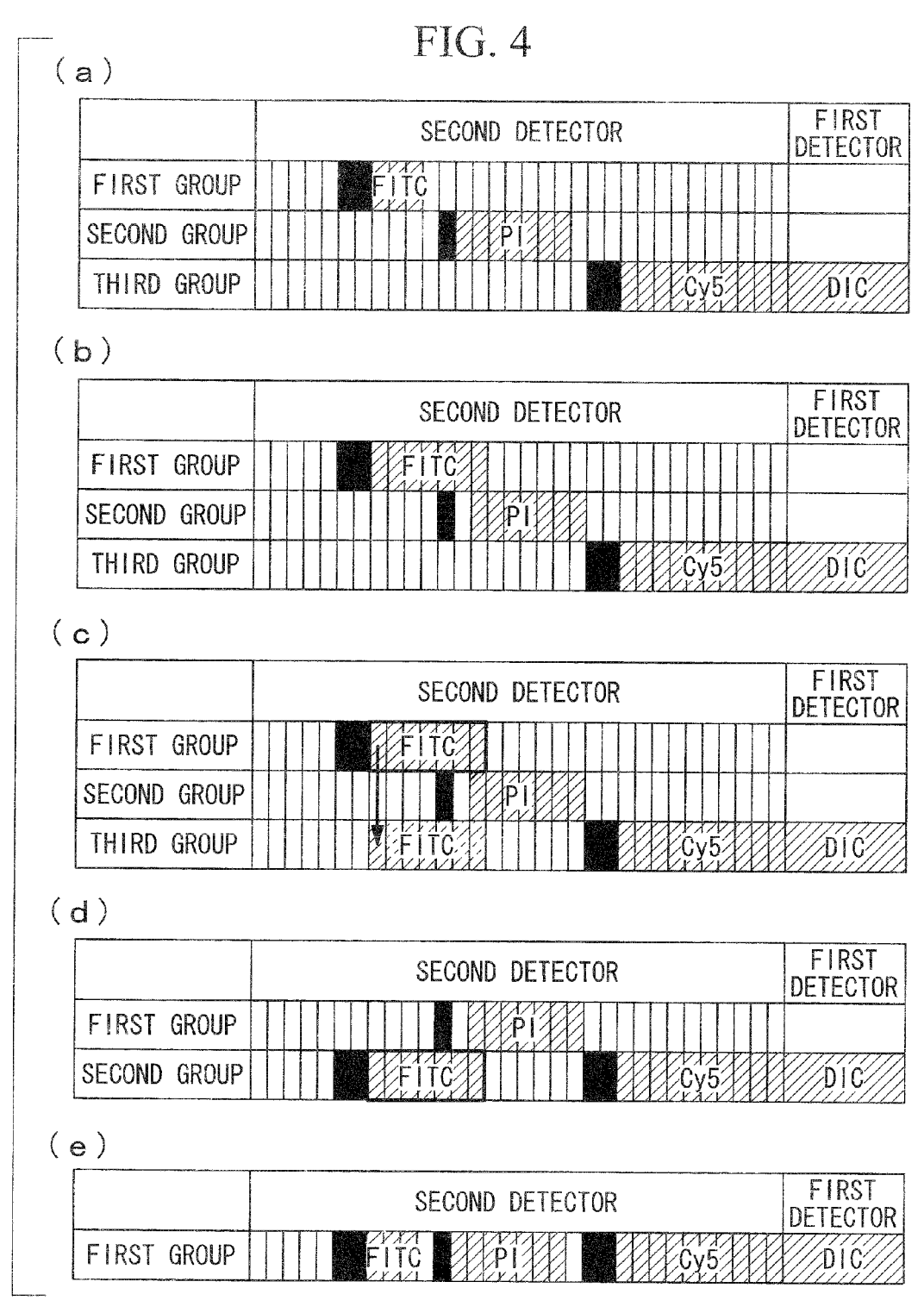

As shown in (a) of FIG. 4, in the table of the GUI, the horizontal axis indicates items corresponding to the photodetectors 8 and 20, and the vertical axis indicates items corresponding to groups. Cells in a column corresponding to the multichannel PMT 20 are each divided, in the direction of the horizontal axis, into 32 subcells corresponding to the 32 detection channels of the multichannel PMT 20.

These 32 subcells are associated with captured items. For example, "FITC" is associated with three subcells corresponding to detection channels for detected wavelengths from 500 nm to 530 nm, the detection channels being located at the positions where the FITC fluorescence is incident. Similarly, "PI" is associated with seven subcells corresponding to detected wavelengths from 550 nm to 620 nm, and "Cy5" is associated with ten subcells corresponding to detected wavelengths from 650 nm to 750 nm. When a captured item is selected with the input device, the GUI registers the selected captured item in the subcells associated with that captured item.

Here, when a plurality of captured items are selected, the GUI allocates the captured items to the same group if the same laser light source 4, 5, or 6 is used for image-capturing of the captured items and allocates the captured items to separate groups if different laser light sources 4, 5, and 6 are used for image-capturing of the captured items. Then, when a captured item for which the first photodetector 8 is used, in this embodiment, "DIC", is selected as a captured item, "DIC" is allocated to the same group as the captured item that is associated with subcells located at the longest wavelengths among the captured items of fluorescence that have been selected.

Furthermore, when "FITC", "PI", and "Cy5", which indicate image-capturing of fluorescence, are selected as captured items, the GUI displays subcells corresponding to the wavelengths of excitation light for the respective types of fluorescence (specifically, the wavelengths of laser light output from the laser light sources 4, 5, and 6) in a different display style from the other subcells. In (a) to (d) of FIG. 4, subcells corresponding to the wavelengths of the excitation light are displayed in black.

The GUI allows the subcells that have been set in advance for the respective captured items, as described above, to be changed by using the input device.

Specifically, when a captured item that has been registered in a subcells is selected with the input device, the GUI allows the outline of the subcells in which that captured item has been registered to be deformed in the direction of the horizontal axis and re-registers the captured item in subcells included in the deformed outline. Thus, the user expands or shrinks the outline so as to include a desired number of subcells in the outline by using the mouse 16, thereby changing the number of subcells in which each captured item is to be registered. In (b) of FIG. 4, the number of subcells in which "FITC" is registered is increased by 4 from the setting shown in (a) of FIG. 4.

By doing so, if fluorescence is weak, the number of subcells is increased toward a longer-wavelength side to increase the amount of light received by the multichannel PMT 20, and, on the other hand, if FITC fluorescence is strong, the number of subcells is reduced to reduce the amount of light received by the multichannel PMT 20, thereby making it possible to adjust the contrast in a fluorescence image to be generated by the computer system 3.

Furthermore, when a captured item that has been registered in a cell is selected with the input device, the GUI allows the selected captured item to be moved in the direction of the horizontal axis and re-registers the captured item in destination subcells. Thus, the user can change the detection channels to be used for image-capturing of each type of fluorescence, by using the mouse 16. In (b) of FIG. 4, seven subcells in which "PI" is registered are moved toward the right side by one subcell from the setting shown in (a) of FIG. 4.

By doing so, the setting can be changed such that detection channels that are far enough away from a detection channel where excitation light is incident are used to detect fluorescence.

Furthermore, as in the first embodiment, the GUI is configured such that the cell or subcells in which each captured item is registered can be changed by using the input device. For example, the user can change the group for image-capturing of the FITC fluorescence, by dragging and dropping "FITC" on the third group from the first group, as shown in (c) of FIG. 4.

Here, the GUI prohibits a captured item from being registered in a subcell in which another captured item has already been registered in an overlapping manner. For example, in (b) of FIG. 4, subcells in which "FITC" is registered and subcells in which "PI" is registered overlap. Therefore, even if the user drags and drops "FITC" on the second group from the first group, the GUI does not accept this operation.

Next, the operational effect of the thus-configured microscope system 1' will be described.

First, the user uses the computer system 3 to select captured items from a pull-down list on the GUI screen displayed on the monitor 14, for example. In this embodiment, "FITC", "PI", "Cy5", and "DIC" are selected. Thus, as shown in (a) of FIG. 4, the GUI registers the four captured items in cells in the table. The user can add appropriate changes, as shown in (b) to (d) of FIG. 4, to the setting shown in (a) of FIG. 4, which is first presented in the table.

The main unit 2' controls the laser light sources 4, 5, and 6 and the photodetectors 8 and 20 based on the conditions set in the table. For example, when the captured items are set as in (a) of FIG. 4, the main unit 2' first turns the laser light source (Ar laser) 4 on to capture FITC fluorescence belonging to the first group, with the second photodetector 20. Next, the main unit 2' turns the laser light source (HeNe-Green laser) 5 on to capture PI fluorescence belonging to the second group, with the second photodetector 20.

Next, the main unit 2' turns the laser light source (HeNe-Red laser) 6 on to capture Cy5 fluorescence and a differential interference image of the specimen S that belong to the third group, with the second photodetector 20 and the first photodetector 8, respectively. Four pieces of image information acquired by the main unit 2' are sent to the computer system 3, and the computer system 3 generates, from the image information, fluorescence images and a differential interference image.

In this way, according to this embodiment, in addition to the effects of the first embodiment, there is an advantage in that the number of operations that the user is required to perform can be further reduced because a plurality of captured items are properly grouped merely by the user selecting the captured items.

In this embodiment, although a description has been given of a case where sequential observation is performed, in which a plurality of groups are sequentially captured with a time difference therebetween, the GUI may allow ON or OFF to be selected for the sequential observation. When OFF is selected for the sequential observation, the GUI puts together the captured items that belong to a plurality of groups into one group, as shown in (e) of FIG. 4.

In this embodiment, regarding the captured items registered in the table, it is possible to select between ON and OFF for image-capturing executed by the main unit 2'. For example, a field (not shown) for inputting ON or OFF for execution of each captured item is provided in the GUI screen displayed on the monitor 14. In the table, the GUI displays a captured item for which "ON" for execution has been selected. On the other hand, in the table, the GUI displays a captured item for which "OFF" for execution has been selected in a different display style from the captured item for which "ON" for execution has been selected, for example, in different color.

In this embodiment, although the wavelengths of light dispersed by the diffraction grating 21 are separately detected by the plurality of detection channels, instead of this, of the light dispersed by the diffraction grating 21, lights having some of the wavelengths may be selectively transmitted through a movable slit, and the lights transmitted through the movable slit may be detected by a common photodetector.

Figure 5:
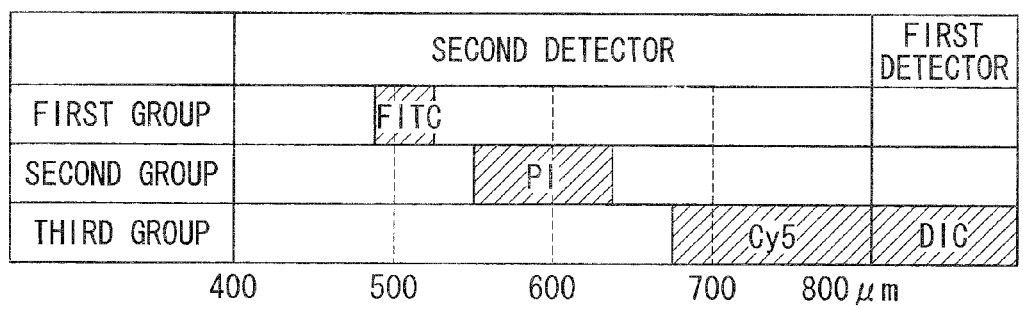
FIG. 5 is a diagram showing a modification of the table of the GUI of the microscope system shown in FIG. 3.

In this case, as shown in FIG. 5, wavelengths corresponding to the wavelengths selected by the movable slit are indicated in the direction of the horizontal axis in the cells corresponding to the second photodetector. Then, the captured items are registered at horizontal-axis-wise locations corresponding to the wavelength bands of the fluorescence.

The following inventions are derived from the first and second embodiments described above.

The present invention provides a microscope system that classifies a plurality of observed lights produced from a specimen into a plurality of groups and that sequentially performs image capturing of the plurality of groups by means of a microscope, the microscope system including: a plurality of image-capturing sections that are provided in the microscope to capture the observed lights; a capture-condition setting section that allows a user to set an image-capturing order for the plurality of groups and the image-capturing sections to be used for image-capturing of the observed lights; and a control section that causes the microscope to perform image capturing of the observed lights according to contents set in the capture-condition setting section, in which the capture-condition setting section has a table in which one axis of a vertical axis and a horizontal axis indicates the groups, the other axis indicates the image-capturing sections, and a plurality of cells that are each associated with one of the groups and one of the image-capturing sections are arrayed in a matrix; and captured items that indicate image-capturing of the observed lights are set in the cells.

According to the present invention, the control section controls the microscope according to capture conditions set in the capture-condition setting section by the user, thereby making it possible to sequentially capture the plurality of observed lights produced from the specimen, in groups.

In this case, the user sets, as the capture conditions, the groups into which the observed lights are classified and the image-capturing sections to be used for image-capturing of the observed lights, in the table of the capture-condition setting section. In this table, captured items that belong to the same group are indicated in the same row or column, and captured items for which the same image-capturing section is used are indicated in the same column or row. Therefore, the user can visually and easily grasp, from the table, a combination of image-capturing of a plurality of observed lights classified into the same group and an image-capturing section to be assigned to image-capturing of an observed light beam, thus making it possible to easily perform grouping of observed lights.

The above-described invention may have a configuration in which a diffraction grating that is provided at a stage prior to at least one of the image-capturing sections and that disperses the observed lights into respective wavelengths is further included; the at least one image-capturing section includes a plurality of detection channels that are arranged in a direction in which the observed lights are dispersed by the diffraction grating and that detect light having wavelengths dispersed by the diffraction grating; and the cells that correspond to the at least one image-capturing section axe each divided into the same number of subcells as the plurality of detection channels, in the direction of the other axis.

By doing so, when a photodetector having a plurality of detection channels is used as the image-capturing section, because the subcells corresponding to the detection channels are indicated in the table, the user can visually and easily set the detection channels to be used to detect the observed lights.

In the above-described configuration in which the cells are each divided into the plurality of subcells, the capture-condition setting section may allow some of the subcells to be grouped and allow each of the captured items to be set in the grouped subcells.

By doing so, a plurality of detection channels are used to detect one observed light beam. Here, by changing the subcells to be grouped, the wavelength band to be detected by the detection channels, which are used to detect each observed light beam, can be easily changed.

In the above-described configuration in which some of the subcells are grouped, the capture-condition setting section may allow an outline of the subcells in which the captured item has been set to be expanded or shrunk in the direction of the other axis to change the number of grouped subcells according to expansion or shrinkage of the outline.

By doing so, the number of subcells in which each captured item has been set is changed by expanding or shrinking the outline of the subcells, thereby making it possible to easily change the number of detection channels to be used for image-capturing of each observed light beam.

In the above-described configuration in which the cells are each divided into the plurality of subcells, regarding the captured items whose observed lights are fluorescence, the capture-condition setting section may display subcells that correspond to wavelengths of excitation light for the fluorescence, in a different display style from the other subcells.

By doing so, when the observed lights are fluorescence, detection channels where reflected light of excitation light that has been radiated onto the specimen to excite the fluorescence and that has been reflected on the specimen is incident are presented to the user. Therefore, the user selects subcells in which captured items are to be set, so as not to overlap with subcells corresponding to the excitation light, thereby making it possible to capture the observed lights separately from the excitation light.

In the above-described configuration in which the cells are each divided into the plurality of subcells, when any of the captured items that have been set in the subcells is dragged and dropped on other subcells, the capture-condition setting section may re-set the captured item in the subcells on which it is dropped.

By doing so, the settings of the detection channels to be used to detect the observed light beam can be easily changed.

In the above-described configuration in which the cells are each divided into the plurality of subcells, the capture-condition setting section may prohibit the plurality of captured items from being set in an overlapping manner in a common subcell in the same cell.

By doing so, it is possible to prevent the same detection channel from being used to detect a plurality of observed lights.

The above-described invention may further include: a diffraction grating that is provided at a stage prior to at least one of the image-capturing sections and that disperses the observed lights into respective wavelengths; and a movable slit that is provided movably in the direction in which the observed lights are dispersed by the diffraction grating and that selects, from the lights having the wavelengths dispersed by the diffraction grating, lights to be transmitted to the image-capturing section, in which, in the cells that correspond to the at least one image-capturing section, wavelengths corresponding to wavelengths of the lights selected by the movable slit may be indicated along the other axis.

By doing so, in the configuration in which some of the observed lights dispersed into wavelengths by the diffraction grating are selected by the movable slit and are captured by the image-capturing section, wavelengths corresponding to the wavelengths selected by the movable slit are indicated in cells. Therefore, the user can visually and easily set the wavelengths to be selected by the movable slit.

In the above-described invention, when any of the captured items that have been set in the cells is dragged and dropped on another cell, the capture-condition setting section may re-set the captured item in the cell on which it is dropped.

By doing so, it is possible to easily change the captured item that has already been set in the table.

In the above-described invention, when any of the captured items that have been set in the cells is dragged and dropped between cells adjacent to each other in the direction of the one axis or outside the table, at an end thereof. In the direction of the one axis, the capture-condition setting section may add a cell between the cells or at the end of the table and re-set the captured item in the added cell.

By doing so, a cell can be added as needed through a simple operation.

In the above-described invention, the capture-condition setting section can select between ON and OFF for sequential image capturing of all the captured items set in the cells, to be executed by the control section, and, when OFF for sequential image capturing is selected, the capture-condition setting section may re-set all the captured items set in the cells in the same group.

By doing so, when sequential image capturing is not performed, it is not necessary to re-set the captured items with a user operation, thus improving the ease of use.

REFERENCE SIGNS LIST 1, 1' microscope system
2 laser scanning microscope main unit (microscope)
3 computer system
4, 5, 6 laser light source
7 scanning unit
8, 9 photodetector (image-capturing section)
10 control unit (control section)

11 objective lens
12 CPU
13 storage medium
14 monitor
15 keyboard
16 mouse
20 multichannel photomultiplier (image-capturing section)
21 diffraction grating
S specimen

The invention claimed is:

1. A microscope system that classifies a plurality of observed lights produced from a specimen into a plurality of groups and that sequentially performs image capturing of the plurality of groups using a microscope, the microscope system comprising:
a plurality of photodetectors that are provided in the microscope to capture the observed lights;
a capture-condition setting section that allows a user to set an image-capturing order for the plurality of groups and the photodetectors to be used for image-capturing of the observed lights; and
a control section that controls the microscope to perform image capturing of the observed lights according to contents set in the capture-condition setting section,
wherein the capture-condition setting section has a table in which one axis of a vertical axis and a horizontal axis indicates the groups, the other axis of the vertical axis and the horizontal axis indicates the photodetectors, and in which a plurality of cells that are each associated with one of the groups and one of the photodetectors are arrayed in a matrix;
wherein each of the cells arrayed in the matrix is configured such that a captured item representing an image capturing operation is registerable therein; and
wherein with respect to each cell in the table that is associated with one of the groups and one of the photodetectors, the capture-condition setting section (i) sets the photodetector associated with the cell to a selected state to execute image capturing with the photodetector when the cell is in a selected state, the selected state being a state in which a captured item is registered in the cell, and (ii) sets the photodetector associated with the cell to a non-selected state so as not to execute image capturing when the cell is in a non-selected state, the non-selected state being a state in which no captured item is registered in the cell.

2. The microscope system according to claim 1, further comprising a diffraction grating that is provided at a stage prior to at least one of the photodetectors and that disperses the observed lights into respective wavelengths,
wherein the at least one photodetector comprises a plurality of detection channels that are arranged in a direction in which the observed lights are dispersed by the diffraction grating and that detect light having wavelengths dispersed by the diffraction grating; and
wherein the cells that correspond to the at least one photodetector are each divided into a same number of subcells as a number of the plurality of detection channels, in the direction of the other axis, such that one cell overlapping with one of the groups and the at least one photodetector and in which at least one capture condition is set is divided into subcells.

3. The microscope system according to claim 2, wherein the capture-condition setting section allows some of the subcells within the table to be selected as a group so as to register a captured item on the selected subcells and to set the detection channels of the photodetector associated with the selected subcells to a selected state to execute image capturing.

4. The microscope system according to claim 3, wherein the capture-condition setting section allows an outline of the subcells selected as a group to be expanded or shrunk in a direction of the other axis so as to change a number of the grouped subcells according to expansion or shrinkage of the outline.

5. The microscope system according to claim 2, wherein the subcells are selectable via a graphical user interface by registering a captured item representing an image capturing operation in desired subcells and, with respect to a captured item representing an image capturing operation in which the observed lights are fluorescence, the capture-condition setting section displays subcells that correspond to wavelengths of excitation light for the fluorescence in a display style different from a display style of the other subcells.

6. The microscope system according to claim 2, wherein the subcells are selectable via a graphical user interface by registering a captured item representing an image capturing operation in desired subcells and, when any captured item that has been set in the subcells is dragged and dropped on other subcells, the capture-condition setting section re-sets the captured item in the subcells on which it is dropped.

7. The microscope system according to claim 2, wherein the subcells are selectable via a graphical user interface by registering a captured item representing an image capturing operation in desired subcells, and the capture-condition setting section prohibits a plurality of captured items from being set in an overlapping manner in a common subcell in a same cell.

8. The microscope system according to claim 1, further comprising:
a diffraction grating that is provided at a stage prior to at least one of the photodetectors and that disperses the observed lights into respective wavelengths; and
a movable slit that is provided movably in the direction in which the observed lights are dispersed by the diffraction grating and that selects, from the lights having the wavelengths dispersed by the diffraction grating, lights to be transmitted to the at least one photodetector,
wherein, in the cells that correspond to the at least one photodetector, wavelengths corresponding to wavelengths of the lights selected by the movable slit are indicated along the other axis.

9. The microscope system according to claim 1, wherein the cells are selectable via a graphical user interface by registering a captured item representing an image capturing operation in desired cells and, when any captured item that has been set in a cell is dragged and dropped on another cell, the capture-condition setting section re-sets the captured item in the cell on which it is dropped.

10. The microscope system according to claim 1, wherein the cells are selectable via a graphical user interface by registering a captured item representing an image capturing operation in desired cells and, when any captured item that has been set in a cell is dragged and dropped between cells adjacent to each other in the direction of the one axis or outside the table, at an end of the table in the direction of the one axis, the capture-condition setting section adds a cell between the cells or at the end of the table and re-sets the captured item in the added cell.

11. The microscope system according to claim 1, wherein the cells are selectable via a graphical user interface by registering a captured item representing an image capturing operation in desired cells and, for respective ones of the captured items set in the cells, the capture-condition setting section can select between ON and OFF regarding execution by the control section and displays the cells in which the captured items are set in styles different from each other depending on the ON and OFF for execution.

12. The microscope system according to claim 1, wherein the cells are selectable via a graphical user interface by registering a captured item representing an image capturing operation in desired cells, and the capture-condition setting section can select between ON and OFF regarding sequential image capturing of all the captured items set in the cells, to be executed by the control section, and when OFF for the sequential image capturing is selected, the capture-condition setting section re-sets all the captured items set in the cells for respective different groups in a same group.

13. The microscope system according to claim 1, wherein each of the captured items is rewritable directly in the cells of the table by user input.

\* \* \* \* \*